(12) United States Patent
Gordon

(10) Patent No.: US 8,573,829 B2
(45) Date of Patent: Nov. 5, 2013

(54) ANIMAL FEED MECHANISM

(76) Inventor: Timothy J. Gordon, Lansing, IA (US)

( * ) Notice: Subject to any disclaimer, the term of this patent is extended or adjusted under 35 U.S.C. 154(b) by 104 days.

(21) Appl. No.: 13/135,102

(22) Filed: Jun. 25, 2011

(65) Prior Publication Data
US 2012/0269028 A1   Oct. 25, 2012

Related U.S. Application Data

(60) Provisional application No. 61/517,476, filed on Apr. 20, 2011.

(51) Int. Cl.
*B01F 15/02* (2006.01)

(52) U.S. Cl.
USPC .............. 366/155.1; 366/155.2; 366/181.1

(58) Field of Classification Search
USPC .......... 366/76.3, 76.93, 290, 292, 297, 155.2, 366/158.4, 156.2, 601, 154.1, 155.1, 156.1, 366/158.1
See application file for complete search history.

(56) References Cited

U.S. PATENT DOCUMENTS

| | | | | |
|---|---|---|---|---|
| 688,955 | A * | 12/1901 | Kendrick | 366/156.1 |
| 988,412 | A * | 4/1911 | Valerius | 366/156.1 |
| 3,485,480 | A * | 12/1969 | Silver | 366/158.4 |
| 3,942,768 | A * | 3/1976 | Hughes | 366/297 |
| 4,712,919 | A * | 12/1987 | Bouldin | 366/133 |
| 5,241,898 | A * | 9/1993 | Newnan | 99/280 |
| 6,067,933 | A | 5/2000 | Cason | |
| 6,123,445 | A | 9/2000 | Grassi | |
| 6,263,750 | B1 * | 7/2001 | Maurer et al. | 366/128 |
| 7,069,752 | B2 * | 7/2006 | Clark et al. | 68/133 |
| 7,708,131 | B2 | 5/2010 | Muth | |
| 7,785,034 | B2 | 8/2010 | Hood et al. | |

OTHER PUBLICATIONS

Big Dutchman; Silos and Augers; Feed Storage and Transport Systems; 4 pages; http://www.bigdutchman.de/fileadmin/products/Silos_and_augers_e.pdf; posted before Jun. 24,2011.
Chore-Time; Flex-Auger Feed Delivery Systems and Assessories; 4 pages; http://www.gillisag.com/hog/pdf/CT_flex_auger.pdf; posted online before Jun. 24, 2011.
GSI; Flex-Flo System; 2 pages; posted online before Jun. 24, 2011 http://www.grainsystems.com/farm/mathandling/flexflo.php.

\* cited by examiner

*Primary Examiner* — Tony G Soohoo
*Assistant Examiner* — Anshu Bhatia
(74) *Attorney, Agent, or Firm* — Camille L. Urban

(57) ABSTRACT

An animal feed mechanism includes a manually operated slide valve interposed between a set of upper agitators and a set of lower screw conveyors. In some examples, two upper agitators are installed within a plastic funnel, and two lower screw conveyors are disposed within a metal auger housing. Each screw conveyor includes an auger driven by its own separate motor. Thus, there are two motors for rotating the two augers. The two motors can be energized individually to selectively rotate either auger or to rotate them concurrently. In some examples, a transmission coupling the two augers to the two agitators conveys power to rotate both agitators regardless of whether either one or both motor driven augers are operating.

15 Claims, 4 Drawing Sheets

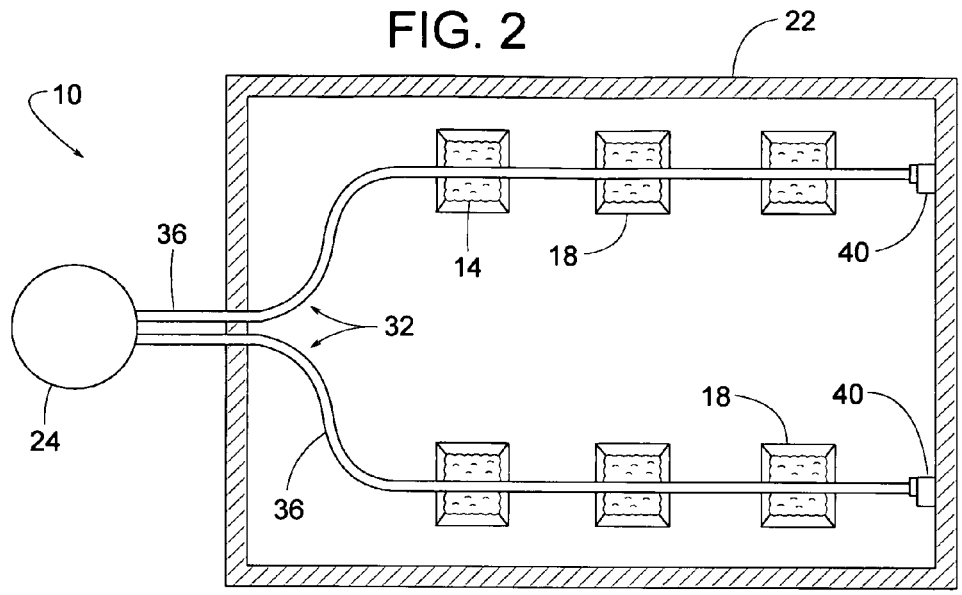
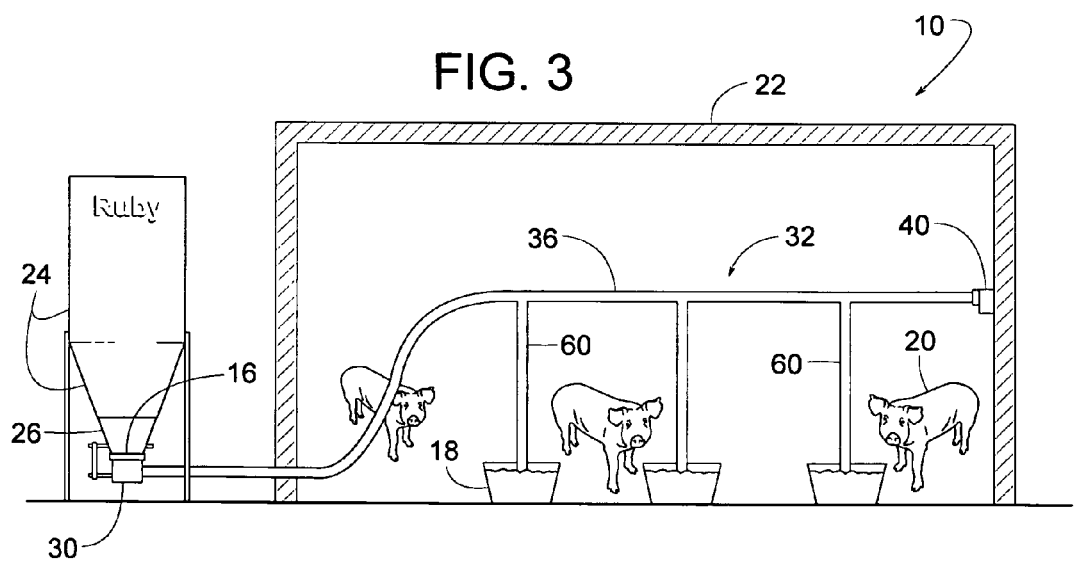

ANIMAL FEED MECHANISM

CROSS REFERENCE TO RELATED APPLICATIONS

This application claims the benefit of provisional patent application Ser. No. 61/517,476 filed on Apr. 20, 2011 by the present inventor.

FIELD OF THE DISCLOSURE

The subject invention generally pertains to animal feed systems and more specifically to an animal feed mechanism for handling and conveying feed particulate.

BACKGROUND

Currently, hoppers and powered screw conveyors are used for delivering feed to animals. Such feed systems, however, have been known for being problematic and requiring periodic maintenance and attention in order to keep the feed flowing and the systems operating.

BRIEF DESCRIPTION OF THE DRAWINGS

FIG. 2 is a top view of the animal feed mechanism installed at an example barn.

FIG. 3 is a side view of FIG. 2.

DETAILED DESCRIPTION

Figure 1:
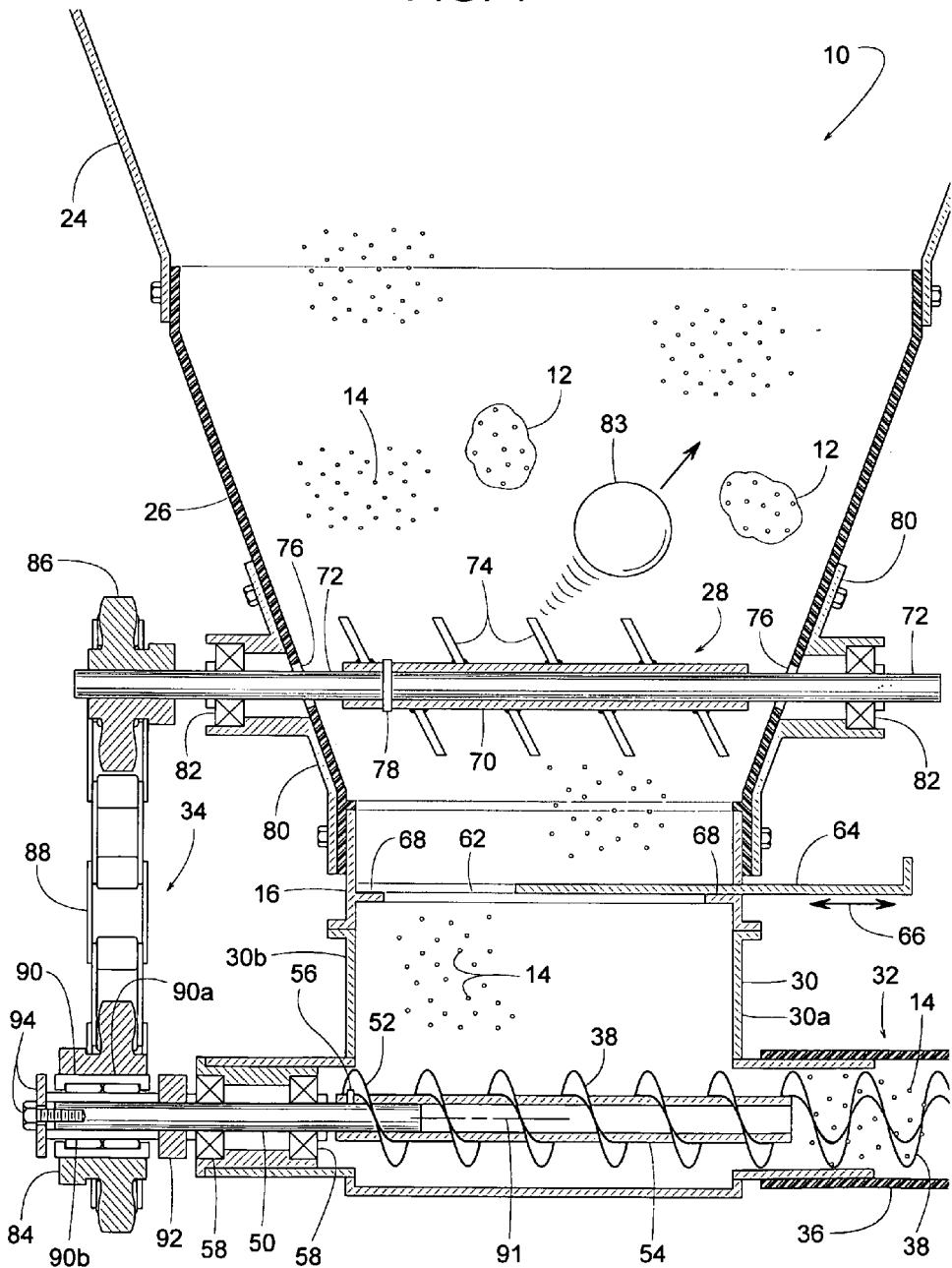
FIG. 1 is a cross-sectional view taken along line 1-1 of FIG. 6 and shows an example of an animal feed mechanism.
Figure 4:
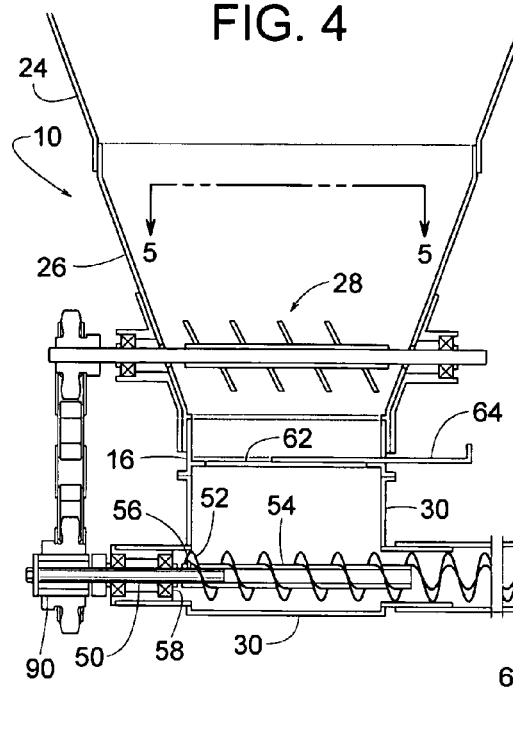
FIG. 4 is a cross-sectional side view similar to FIG. 1 but showing more elements associated with the example animal feed mechanism.
Figure 5:
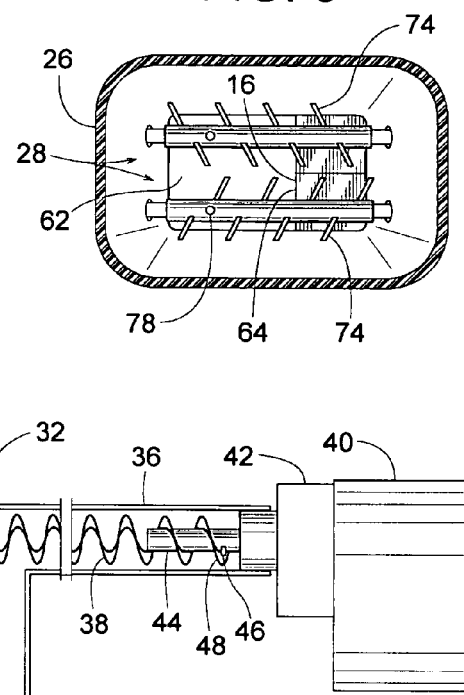
FIG. 5 is a cross-sectional top view taken along line 5-5 of FIG. 4.

FIGS. 1-7 show an example animal feed mechanism 10 with novel means for breaking up chunks 12 of feed particulate 14 (e.g., grain granules, corn, cereal, pellets, etc.) that tend to collect and otherwise jam in an area above a valve 16 in feed mechanism 10. Although feed mechanism 10 can be used in feeding a wide variety of animals in various environments, some examples of feed mechanism 10 are particularly suited for distributing feed 14 to a plurality of bins 18 for feeding pigs 20 in a barn 22.

Some examples of feed mechanism 10 comprise a relatively large hopper 24 for receiving feed 14 from a feed supplier, a funnel 26 for receiving feed 14 from hopper 24, at least one rotatable agitator 28 in funnel 26 for breaking up chunks 12, an auger housing 30 underneath funnel 26 for receiving feed 14 from funnel 26, valve 16 for adjusting the feed flowing from funnel 26 to auger housing 30, at least one screw conveyor 32 for conveying feed 14 from auger housing 30 to bins 18, and a transmission 34 for powering the rotation of agitator 28 via the rotational energy of screw conveyor 32. The term, "transmission" means any apparatus for transferring rotational energy from one rotating element to another.

Some examples of screw conveyor 32 and associated hardware include a feed tube 36 connected to auger housing 30, a flexible auger 38 extending through feed tube 36 and into auger housing 30 for urging feed 14 out from within housing 30 and through feed tube 36, a motor 40 with a speed-reducing gearbox 42 and an output shaft 44 for rotating auger 38 (i.e., motor 40 imparts rotational energy to auger 38), a fastener 46 for connecting a proximal end 48 of auger 38 to output shaft 44, a shaft 50 (also referred to as conveyor shaft 50) for supporting a distal end 52 of auger 38, a tubular shaft extension 54 for supporting auger 38 inside auger housing 30, a fastener 56 for attaching the auger's distal end 52 to shaft 50 and/or to shaft extension 54, one or more bearings 58 (e.g., rolling element bearing, journal bearing, bushing, etc.) for supporting shaft 50 relative to auger housing 30, and one or more tubular downspouts 60 extending from feed tube 36 to deliver feed 14 to bins 18. For the illustrated example, feed mechanism 10 include two screw conveyors 32 that are substantially the same in structure and function in transferring feed 14 from auger housing 30 to bins 18.

To selectively stop or restrict the flow of feed 14 from funnel 26 to auger housing 30, valve 16 defines an adjustable restriction 62 with an open area that is varied by adjustably positioning (manually or otherwise) one or more valve plates 64 over restriction 62. Arrow 66 represents adjusting valve 16 by sliding plate(s) 64 horizontally along a plate-guiding feature 68. In some examples, valve 16 is part of auger housing 30. In other examples, valve 16 is its own component installed between auger housing 30 and funnel 26.

Valve 16 can create a substantial flow restriction downstream of the above-funnel 26, so chunks 12 or clumps of feed particulate 14 tend to get hung up in the area just above valve 16. So, one or more agitators 28 are rotated to break up those chunks. In some examples, each agitator 28 comprises a sleeve 70 attached to a shaft 72 (also referred to as agitator shaft 72). A plurality of radial protrusions 74 solidly extending from sleeve 70 is what breaks up chunks 12. In some examples, sleeve 70 is removably fastened to shaft 72 to facilitate the installation and removal of agitator 28 relative to funnel 26. Installation, for example, can be achieved by first aligning sleeve 70 with holes 76 in funnel 26 and subsequently inserting shaft 72 axially through holes 76 and sleeve 70. After shaft 72 has been inserted through sleeve 70 and holes 76, a common suitable fastening means (e.g., a set screw, another type of screw, roll pin, a shear pin 78, dowel, key, spline, clamp, etc.) firmly holds sleeve 70 to shaft 72, so the two rotate as a unit. Two brackets 80 and a set of bearings 82 (e.g., rolling element bearings, journal bearing, bushing, etc.) support shaft 72 within funnel 26.

To further assist in breaking up chunks 12, some examples of feed mechanism 10 include a massive body 83 disposed within funnel 26 where radial protrusions 74 of rotating agitator 28 can strike and propel body 83 in a generally unrestricted manner (e.g., a free floating body) through the feed particulate 14 in funnel 26. As body 83 gets knocked around and ricochets within funnel 26, body 83 might strike and breakup chunks 12. Examples of body 83 can be of various shapes including, but not limited to, spherical with a smooth outer surface, generally spherical with a dimpled or otherwise roughened outer surface, multifaceted, hollow with holes around its outer periphery, etc. Examples of body 83 can be made of various materials including, but not limited to, metal, steel, iron, brass, stainless steel, cast iron, plastic, various combinations thereof, etc. In some examples, massive body 83 is of sufficient size to prevent body 83 from completely bypassing agitator 28 and subsequently passing through restriction 62 to enter auger housing 30.

To power the rotation of two agitators 28 via the rotational energy of either or both of screw conveyors 32, some examples of transmission 34 comprise two drive wheels 84 (e.g., sprocket, sheave, cogged wheel, etc.) coupled to the two conveyor shafts 50, two driven wheels 86 (e.g., sprocket, sheave, cogged wheel, etc.) keyed or otherwise solidly affixed to the two agitator shafts 72, and a flexible drive loop 88 (e.g., roller chain, V-belt, cogged belt, etc.) interconnecting wheels 84 and 86.

In some applications, motors 40 are selectively energized to convey feed 14 only to certain chosen bins 18 via one screw conveyor 32 and/or via the other screw conveyor 32. In other words, either motor 40 can be energized alone, or they can be energized concurrently. To ensure both agitators 28 are operating regardless of whether only one or both motors 40 are energized, each wheel 84 is coupled to its corresponding shaft 50 via a roller clutch 90, such that one roller clutch 90 and one auger 38 share a common rotational axis 91, and another roller clutch 90 and another auger 38 share another common rotational axis 91, wherein the two rotational axes 91 are radially spaced apart from each other. The term, "roller clutch" refers to any device that controls engagement between a shaft and a wheel mounted thereon such that when the shaft rotates in one direction, the device forces the wheel to rotate with the shaft so that the wheel and the shaft rotate together as a unit, but when the shaft rotates in the opposite direction, the device allows the shaft to freely rotate on its own without forcing the wheel to rotate with it. In other words, a roller clutch can only transmit significant torque in one direction of rotation while allowing free-wheeling or overrunning in the opposite direction. Alternate terms used for a roller clutch or comparable devices thereof include, a unidirectional clutch, freewheel, rotational ratchet, clutch bearing, and sprag.

In some examples, roller clutch 90 includes a Timken RCB 121616 outer race (e.g., item 90*a*) affixed to drive wheel 84. In some examples, roller clutch 90 also includes a Timken IR 081216 needle bearing inner race (e.g., item 90*b*) affixed to conveyor shaft 50 (affixed, for example, via item 90*b* being axially clamped between a collar 92 and a screw/washer 94). The Timpken Company has its headquarters in Canton, Ohio.

Figure 6:
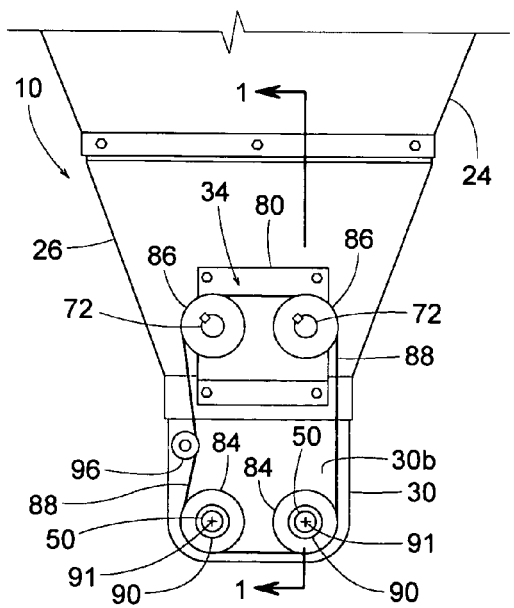
FIG. 6 is an end view showing one end of the example feed mechanism.
Figure 7:
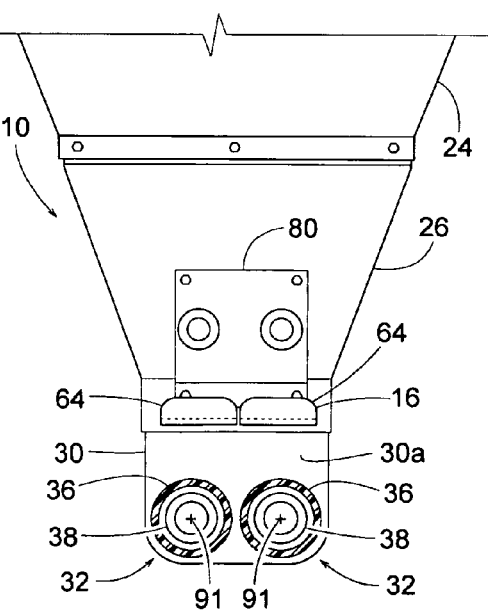
FIG. 7 is an end view showing another end of the example feed mechanism.

The operation of one example transmission 34 is perhaps best understood with reference to FIGS. 6 and 7, wherein FIG. 7 shows feed tubes 36 extending from a first end 30*a* of auger housing 30, and FIG. 6 shows transmission 34 in proximity with a second end 30*b* of auger housing 30. FIG. 6 also shows an optional idler wheel 96 for taking up possible slack in drive loop 88. In this example, each roller clutch 90 forces its corresponding drive wheel 84 to rotate with its corresponding conveyor shaft 50 when conveyor shaft 50 rotates in a first direction, e.g., counterclockwise as viewed from the perspective shown in FIG. 6 (i.e., looking at the drawing sheet). Each roller clutch 90 also allows free-wheeling relative rotation between its corresponding drive wheel 84 and its respective conveyor shaft 50 when drive wheel 84 is forced to rotate in a counterclockwise direction relative to or faster than its corresponding conveyor shaft 50. The installed orientation of roller clutches 90 and the resulting aforementioned example counterclockwise direction is chosen based on the right-hand or left-hand helix of auger 38.

Consequently, in this example, if only one motor 40 is energized (either one), that motor 40 will drive the rotation of its corresponding auger 38 and conveyor shaft 50, which in turn will rotate all four wheels 84 and 86 via drive loop 88, and thus will rotate both agitators 28; however, one roller clutch 90 will allow free-wheeling of the drive wheel 84 that is associated with the inactive auger 38 connected to the de-energized motor 40. Energizing both motors 40 rotate both augers 38 and both agitators 28.

Although the actual construction of animal feed mechanism 10 may vary, in some examples, hopper 24 and auger housing 30 are comprised of sheet metal while funnel 26 is comprised of plastic. Hopper 24 is much larger than funnel 26, so hopper 24 is suitable for holding and storing a large quantify of feed 14. Funnel 26, on the other hand, is designed for channeling feed 14 from hopper 24 to auger housing 30. Consequently, funnel 26 is designed to be much smaller than hopper 24, which makes funnel 26 readily producible via plastic injection molding. Funnel 26 being made of plastic also provides a break or interruption in electrical continuity between the two metal components, hopper 24 and auger housing 30. Such a break or interruption in electrical continuity might be beneficial in the occurrence of potential electrical problems, e.g., lightening and/or electrostatic sparking/ignition. Placing agitator 28 within a plastic housing (i.e., funnel 26) rather than inside a metal housing, such as inside hopper 24 or inside auger housing 30, may provide additional benefits. If agitator 28, for example, were inside a sheet metal housing, noise generated by agitator 28 might be amplified by the sheet metal in a manner perhaps similar to a violin string transmitting its vibration to the bouts or body of a violin. Plastic, on the other hand, might be more effective at dampening noise generated by agitator 28.

Figure 8:
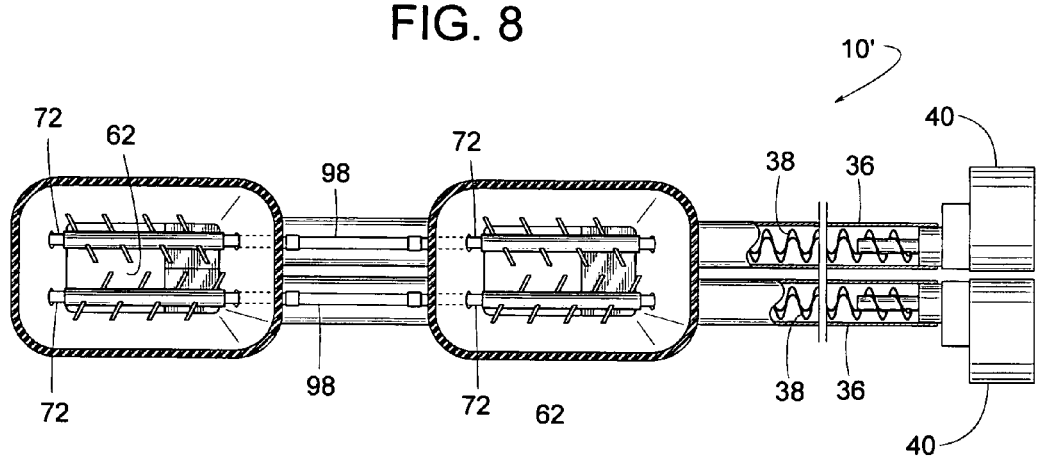
FIG. 8 is a cross-sectional top view similar to FIG. 5 but showing another example of an animal feed mechanism.
Figure 9:
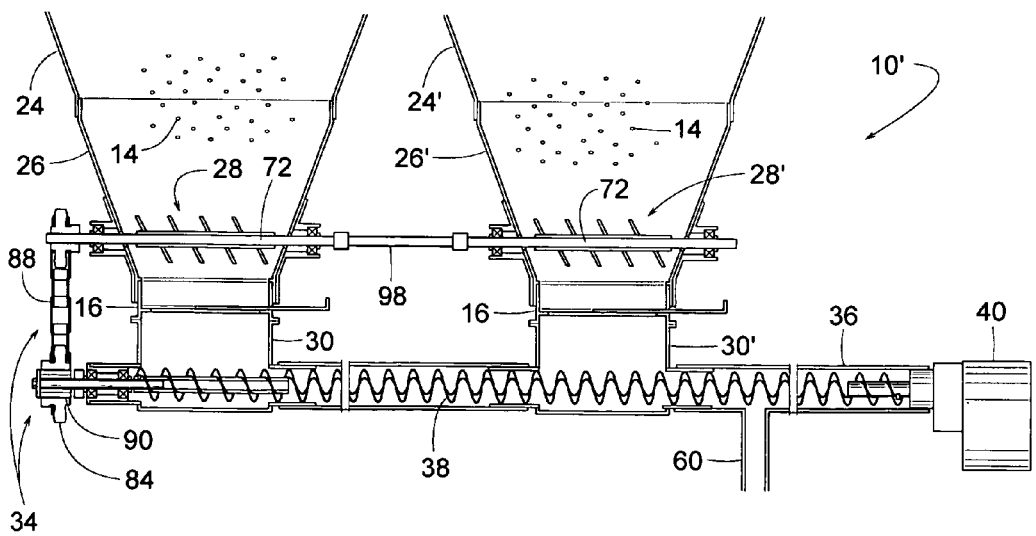
FIG. 9 is a cross-sectional side view similar to FIG. 4 but showing the example feed mechanism of FIG. 8.

In some examples, as shown in FIGS. 8 and 9, an animal feed mechanism 10' further comprises a second hopper 24' for receiving feed 14, a second funnel 26' spaced apart from first funnel 26 for receiving feed 14 from second hopper 24', a second agitator 28' disposed within second funnel 26', a second auger housing 30' disposed underneath second funnel 26' for receiving feed 14 from second funnel 26', and at least one drive shaft 98 coupling first agitator 28 in first funnel 26 to the second agitator 28' in second funnel 26'. Drive shaft 98 causes the rotation of agitator 28 in first funnel 26 to rotate agitator 28' in second funnel 26', thus only one transmission 34 is used for driving agitators 28 and 28' in two separate funnels 26 and 26'. In this illustrated example, both augers 38 extend through both auger housings 30 and 30'.

Although the invention is described with respect to a preferred embodiment, modifications thereto will be apparent to those of ordinary skill in the art. For example, it is well within the scope of the invention to add guarding around various moving parts including, but not limited to, drive shaft 98, transmission 34, etc. It is also well within the scope of the invention to add gaskets, seals and/or shields wherever desired. The scope of the invention, therefore, is to be determined by reference to the following claims:

The invention claimed is:

1. An animal feed mechanism for handling feed, the animal feed mechanism comprising:
   a first hopper for receiving the feed;
   a first funnel for receiving the feed from the first hopper, the first funnel being disposed underneath the first hopper and being smaller than the first hopper;
   a first agitator disposed for rotation within the first funnel;
   a first auger housing disposed underneath the first funnel for receiving the feed from the first funnel;
   a first screw conveyor comprising a first feed tube and a first auger, the first feed tube being connected to the first auger housing, the first auger extending through the first feed tube and into the first auger housing, the first auger being rotatable to urge the feed out from within the first auger housing and through the first feed tube;

a valve being interposed between the first agitator and the first auger, the valve defining an adjustable restriction for transferring the feed from the first funnel to the first auger housing;

a first motor coupled to the first auger to impart rotational energy that rotates the first auger within the first feed tube; and a transmission mounted to at least one of the first funnel and the first auger housing, the transmission coupling the first auger to the first agitator, the transmission transferring the rotational energy from the first auger to the first agitator to rotate the first agitator within the first funnel as the first auger rotates within the first feed tube;

a second agitator disposed within the first funnel;

a second screw conveyor comprising a second feed tube and a second auger, the second feed tube being connected to the first auger housing, the second auger extending through the second feed tube and into the first auger housing, the second auger being rotatable to urge the feed out from within the first auger housing and through the second feed tube;

a first roller clutch coupled to the first auger, the first roller clutch and the first auger being disposed along a first rotational axis; and a second roller clutch coupled to the second auger, the second roller clutch and the second auger being disposed along a second rotational axis that is radially spaced apart from the first rotational axis, said first and second roller clutch for allowing the transmission of rotation to said first agitator and said second agitator if only one of said first auger or said second auger is rotating.

2. The animal feed mechanism of claim 1, wherein the first auger housing comprises two opposite facing ends that include a first end and a second end, and the animal feed mechanism wherein both the first feed tube and the second feed tube extend from the first end of the first auger housing, and the transmission being disposed in proximity with the second end of the first auger housing.

3. The animal feed mechanism of claim 1, wherein the first agitator comprises a first agitator shaft, a first sleeve disposed on the first agitator shaft, and a first plurality of radial protrusions extending from the first sleeve.

4. The animal feed mechanism of claim 1, wherein the first hopper is made primarily of metal, the first auger housing is made primarily of metal, and the first funnel which contains the first agitator and is interposed between the first hopper and the first auger housing is made primarily of plastic.

5. The animal feed mechanism of claim 1, further comprising;

the second auger being rotatable independently of the first auger to urge the feed out from within the first auger housing and through the second feed tube, wherein the rotational energy imparted by the first motor rotates both the first agitator and the second agitator regardless of whether the second auger is rotating.

6. The animal feed mechanism of claim 1, further comprising:

a second hopper for receiving the feed;

a second funnel for receiving the feed from the second hopper; the second funnel being disposed underneath the second hopper and being spaced apart from the first funnel;

a third agitator disposed within the second funnel;

a second auger housing disposed underneath the second funnel for receiving the feed from the second funnel; and a drive shaft coupling the first agitator in the first funnel to the third agitator in the second funnel.

7. An animal feed mechanism for handling feed, the animal feed mechanism comprising:

a first hopper for receiving the feed;

a first funnel for receiving the feed from the first hopper, the first funnel being disposed underneath the first hopper;

a first agitator disposed for rotation within the first funnel;

a first auger housing disposed underneath the first funnel for receiving the feed from the first funnel;

a second hopper for receiving the feed;

a second funnel for receiving the feed from the second hopper, the second funnel being disposed underneath the second hopper and being spaced apart from the first funnel;

a second agitator disposed within the second funnel;

a second auger housing disposed underneath the second funnel for receiving the feed from the second funnel; and a drive shaft coupling the first agitator in the first funnel to the second agitator in the second funnel;

a first screw conveyor comprising a first auger;

a second screw conveyor comprising a second auger, at least one feed tube connected to the first auger housing and the second auger housing through which at least one of said first screw conveyor and said second screw conveyor moves feed out from said first auger housing and said second auger housing into said at least one feed tube;

a motor coupled to the first auger to impart rotational energy that rotates the first auger;

a transmission mounted to at least one of the first funnel and the first auger housing, the transmission coupling the first auger to the first agitator, the transmission transferring the rotational energy from the first auger to the first agitator to rotate the first agitator within the first funnel as the first auger rotates;

a first roller clutch coupled to the first auger, the first roller clutch and the first auger being disposed along a first rotational axis; and a second roller clutch coupled to the second auger, the second roller clutch and the second auger being disposed along a second rotational axis that is radially spaced apart from the first rotational axis, said first and second roller clutch for allowing the transmission of rotation to said first agitator and said second agitator if only one of said first auger or said second auger is rotating.

8. The animal feed mechanism of claim 7, further comprising:

a second feed tube, the second feed tube being connected to the first auger housing and the second auger housing, the second auger extending through the second feed tube and into both the first auger housing and the second auger housing, the second auger being rotatable to urge the feed through the second feed tube.

9. The animal feed mechanism of claim 7, wherein the first agitator comprises a first agitator shaft, a first sleeve disposed on the first agitator shaft, and a first plurality of radial protrusions extending from the first sleeve.

10. An animal feed mechanism for handling feed, the animal feed mechanism comprising:

a first hopper for receiving the feed;

a first funnel for receiving the feed from the first hopper, the first funnel being disposed underneath the first hopper;

a first agitator disposed for rotation within the first funnel;

a first auger housing disposed underneath the first funnel for receiving the feed from the first funnel;

a first screw conveyor comprising a first feed tube and a first auger, the first feed tube being connected to the first auger housing, the first auger extending through the first feed tube and into the first auger housing, the first auger being rotatable to urge the feed out from within the first auger housing and through the first feed tube;

a second screw conveyor comprising a second feed tube and a second auger, the second feed tube being connected to the first auger housing, the second auger extending through the second feed tube and into the first auger housing, the second auger being rotatable to urge the feed out from within the first auger housing and through the second feed tube;

a first motor coupled to the first auger to rotate the first auger within the first feed tube;

a second motor coupled to the second auger to rotate the second auger within the second feed tube, the first motor and the second motor being selectively energizable concurrently and one-at-a-time; and a transmission mounted to at least one of the first funnel and the first auger housing, the transmission coupling the first auger to the first agitator, the transmission coupling the second auger to the first agitator, the transmission transferring rotation of the first auger to the first agitator when the first motor is energized and the second motor is de-energized, the transmission transferring rotation of the second auger to the first agitator when the second motor is energized and the first motor is de-energized, the transmission transferring rotation of at least one of the first auger and the second auger to the first agitator when both the first motor and the second motor are energized concurrently.

11. The animal feed mechanism of claim 10, wherein the transmission includes a first roller clutch.

12. The animal feed mechanism of claim 11, wherein the first roller clutch is coupled to the first auger, and the first roller clutch and the first auger are disposed along a first rotational axis.

13. The animal feed mechanism of claim 10, further comprising:
a first roller clutch coupled to the first auger, the first roller clutch and the first auger being disposed along a first rotational axis; and
a second roller clutch coupled to the second auger, the second roller clutch and the second auger being disposed along a second rotational axis that is radially spaced apart from the first rotational axis.

14. The animal feed mechanism of claim 10, wherein the first auger housing comprises two opposite facing ends that include a first end and a second end, both the first feed tube and the second feed tube extending from the first end of the first auger housing, and the transmission being disposed in proximity with the second end of the first auger housing.

15. The animal feed mechanism of claim 10, wherein the first agitator comprises a first agitator shaft, a first sleeve disposed on the first agitator shaft, and a first plurality of radial protrusions extending from the first sleeve.

* * * * *